Nov. 11, 1952　　　　　L. E. HINDS　　　　2,617,288
MOTORCYCLE LOCK
Filed Aug. 2, 1950　　　　　　　　　　　2 SHEETS—SHEET 1
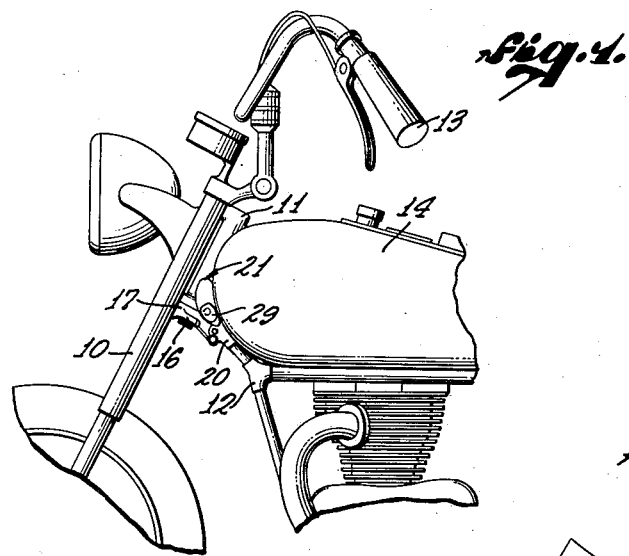
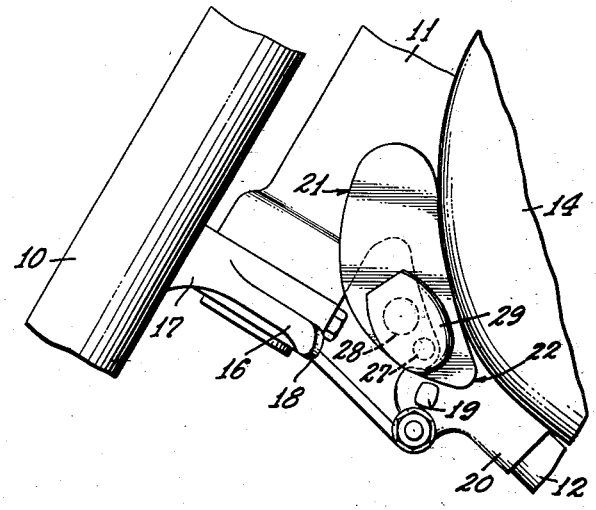
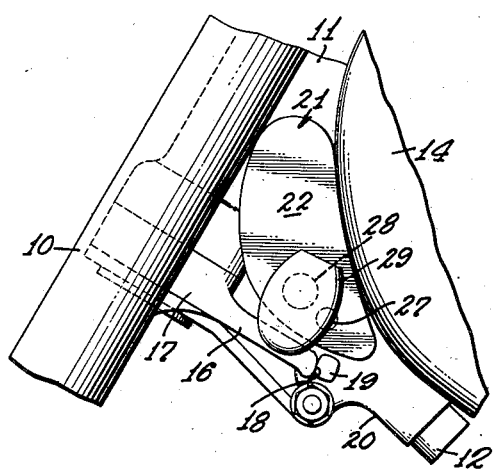
LLOYD E. HINDS,
INVENTOR.
BY
ATTORNEY.

Nov. 11, 1952   L. E. HINDS   2,617,288
MOTORCYCLE LOCK
Filed Aug. 2, 1950   2 SHEETS—SHEET 2
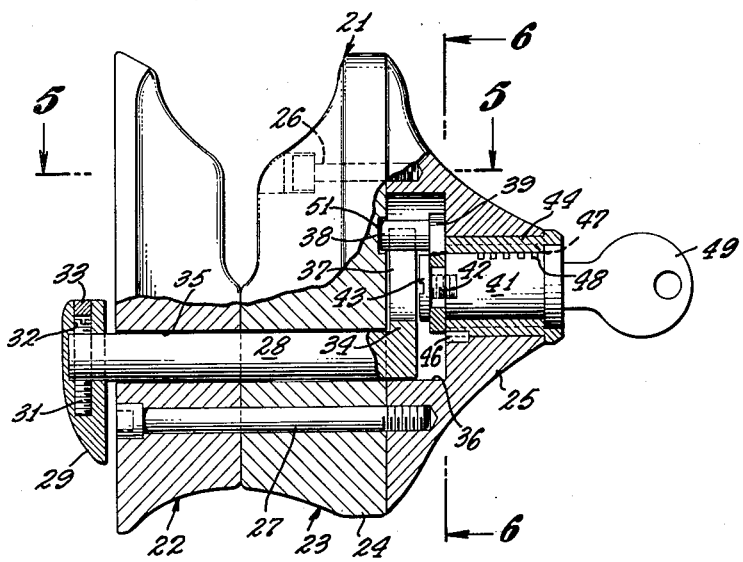
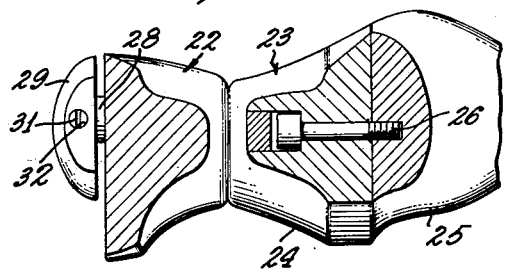
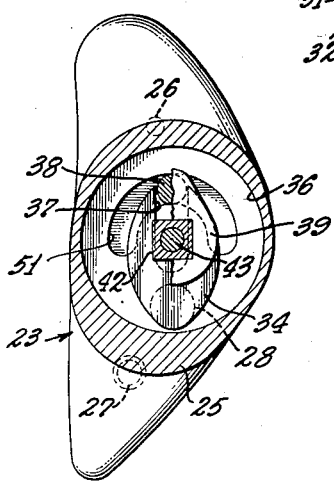
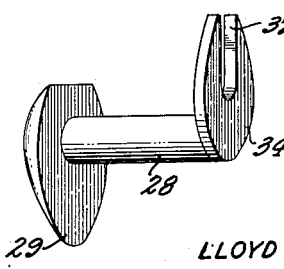
LLOYD E. HINDS,
INVENTOR.
BY George J. Smyth
ATTORNEY.

Patented Nov. 11, 1952

2,617,288

UNITED STATES PATENT OFFICE 2,617,288

MOTORCYCLE LOCK

Lloyd E. Hinds, Los Angeles, Calif.

Application August 2, 1950, Serial No. 177,302

5 Claims. (Cl. 70—233)

This invention relates to motorcycle locks and particularly to such a lock which is adapted to be permanently mounted to the frame of the motorcycle and operable to hold the fork element of the motorcycle at a sharp angle to the longitudinal axis of the motorcycle.

The lock of the present invention is designed particularly for use with the present day lightweight motorcycles which are not supplied with a locking device other than the usual ignition lock. Such motorcycles today are usually locked by threading a length of chain through the spoked wheels and around a frame member after which the opposite ends of the chain are secured by a conventional padlock. This type of lock is objectionable to many cyclists as it requires a storage compartment on the cycle.

The lock of the present invention is permanently installed at the appropriate location on the frame of the motorcycle and once installed cannot be removed without destroying the lock itself through a metal cutting tool, the use of which would call attention to the fact that an unauthorized person was tampering with the motorcycle. The lock includes a dog or detent engageable with means carried by the front fork element for limiting movement of the latter to prevent the same from being turned into contact with the gasoline tank which otherwise might damage the tank as, for instance, when the front wheel was turned at a sharp angle in parking the motorcycle. With the lock of the present invention, the steering or front wheel may be turned to a sharp angle to the longitudinal axis of the motorcycle, after which the dog or detent member can be moved into a position in which the same is engaged by the limiting means when the wheel is attempted to be returned to its normal driving position relative to the frame.

With the dog or detent element in the locking position, the fastening means used to mount the body of the lock to the motorcycle frame are inaccessible and the lock is not movable from the frame only by metal cutting tools.

Other features and advantages of the present invention will be hereinafter apparent from the following description, particularly when taken in connection with the accompanying drawing, in which Figure 1 is a fragmentary side view of the front of a motorcycle showing the top of the front fork and the location and approximate size of the lock mounted in the angle between the steering head and the front down tube of the frame of the motorcycle;

Figure 2 is a fragmentary side view drawn on a larger scale, showing the lock in inoperative position;

Figure 3 is a fragmentary view drawn on the same scale as Figure 2 but showing the front fork turned at an angle and the lock in operative position to prevent the front fork from being moved from that position;

Figure 4 is a view, partly in section, showing the lock in assembled relation but removed from the motorcycle;

Figure 5 is a section taken along line 5—5 of Figure 4;

Figure 6 is a section taken along line 6—6 of Figure 4; and

Figure 7 is a perspective view of one element of the lock removed from the same to more clearly illustrate the element.

The lock of the present invention is particularly adapted to be used with a motorcycle of the type shown in Figure 1 of the drawing, having a front fork element 10 mounted to a steering head column 11 which supports the upper end of the tubular member 12 of the main frame member of the motorcycle. Handle bars 13 are suitably connected to the front fork for rotatably moving the same to position the front wheel of the motorcycle. The forward portion of a gasoline tank 14 is fitted into the angle between the steering column 11 and the tubular member 12 of the frame. In this type of motorcycle, a sharp turn of the front fork element is liable to bring the fork violently against the forward end of the tank and to prevent such injury to the tank, these motorcycles are fitted with members for limiting turning movement of the front fork element. In the illustrated embodiment of the present invention, these stop elements are in the form of flanges or arms 16 carried at opposite sides of a member 17 forming a part of the front fork element and rotatable with the same. Each flange 16 terminates at the rearward end thereof in a relatively flat face 18 engageable with a contact abutment or lug 19 carried on each of the opposite sides of a fitting 20 in which is mounted the upper end of the tubular member 12 of the main frame.

The lock of the present invention is adapted to be fitted between the lower end of the steering head column 11 and the tubular member 12 and includes a member adapted to be moved over one of the flanges 16 after the front fork element is turned to move the member 17 to the one side. As the locking member can be held in the position in which the same interferes with the return movement of the front fork element of the motorcycle, the front wheel of the motorcycle will thus be held at a sharp angle to the longitudinal axis of the cycle until the member of the lock engaging over the flange 16 is moved out of the way of the flange.

The body of the lock of the present invention comprises a bi-part clamping element 21 including two body halves 22 and 23. The body half 23, referring now to Figure 4, comprises two elements 24 and 25. The two elements 24 and 25 are held together as a unit by a bolt 26 passed through a bore formed in the element 24 and threadedly engaged in a tapped opening formed in the element 25. The facing surfaces, that is the engaged surfaces of the elements 24 and 25, are substantially coplanar as is clearly shown in Figure 4.

The body halves 22 and 23 are formed with surfaces complementary to the engaged surfaces of the motorcycle frame member to the end that the two body halves will fit snugly into the space between the steering head column 11 and the tubular frame member 12. The head of the bolt 26 is obviously not accessible after the body halves 22 and 23 are positioned so that there is no way to effect separation of the elements 24 and 25 once the body members are in position on the frame. The body members 22 and 23 are clamped in position on opposite sides of the frame by a threaded stud or bolt 27 passed through aligned bores in the body member 22 and element 24 and engaged in a tapped opening formed in the element 25.

It will be seen, referring to Figure 1 of the drawing, that the lock device of the present invention, when installed in position, does not interfere in any way with the operation of the cycle. The exposed surfaces of the body halves may be given any finish desired so that the lock will not detract from the appearance of a motorcycle to which it is mounted.

The body halves 22 and 23 are each formed with a bore which bores, when the body halves are mounted in position on opposite sides of the frame, form an elongated passage 35 for rotatably supporting a shaft 28, the one end of which projects outwardly from the body half 22. This projecting end of the shaft 28 carries the locking member which may comprise a relatively thick, somewhat oval-shaped dog element identified by the reference character 29. This dog, in the illustrated embodiment of the invention, is formed with a blind bore to receive the projecting end of the shaft 28. The dog is held to the shaft by means of a headless bolt 31 which is passed through a bore 32 formed at the one side of the dog 29 and thence through an aligned passage or bore diametrically formed through the projecting end of the shaft 28 and threaded into a tapped opening formed as a continuation of the bore 32 of the dog. To prevent removal of the headless bolt 31, the outer end of the bore 32 is preferably closed by a plug-like element 33 forcibly driven into the open end of the bore 32.

The end of the shaft 28 opposite to the end to which the dog 29 is secured carries a bifurcated member 34 which, as shown in Figures 6 and 7, is formed with a slot 37 presenting substantially parallel opposite edges. Although the bifurcated element 34 in the illustrated embodiment of the invention has been shown as formed integral with the shaft 28, it is to be understood that this element may be formed separately and secured to the shaft in any manner desired.

The bifurcated element 34 is housed within a cylindrical chamber 36 formed in the body half 23 when the two elements 24 and 25 are assembled. The chamber 36 is formed in part by a cylindrical bore extending inwardly from the planar face of the element 25 and in part by the planar face of the element 24. This is clearly shown in Figure 4 of the drawing.

As the passage 35 in which the shaft 28 is rotatably mounted opens into the chamber 36 adjacent to one edge thereof, the bifurcated element 34 is limited to a partial revolution about the axis of the shaft 28 by the cylindrical wall of the bore which forms a part of the chamber 36. This movement of the bifurcated element 34 is sufficient to move the dog 29 from the position shown in Figure 2 to the position shown in Figure 3. In the position of the dog shown in Figure 2, the fork element of the motorcycle may be moved to a position in which the face 18 of the flange 16 engages the lug 19 carried by the fitting 20. This is so for in this position the dog 29 does not interfere with the arcuate movement of the flange 16. This is the normal driving position of the dog 29, but when it is desired to leave unattended a motorcycle equipped with a lock of the present invention, the front fork element is turned to bring the face 18 of the one flange 16 into engagement with the lug 19. As should be understood now, this moves the front wheel of the motorcycle to an angular position relative to the longitudinal axis of the cycle. With the wheel held in this position, the bifurcated element 34 is moved to in turn move the dog 29 to a position in which it engages over the flange 16 and prevents the return of the fork to its normal driving position.

Although a number of means can be provided for arcuately moving the bifurcated element 34, in the now preferred embodiment of the present invention, this means comprises a pin 38 carried by one end of an arm 39, the opposite end of which is rigidly fixed centrally of a lock cylinder or barrel 41. To positively hold the arm 39 against movement relative to the barrel, the inner end of the latter is preferably provided with a square projection 42 which extends into a square opening formed in the arm 39 adjacent the end thereof. The arm is retained in position on the projection of the lock barrel by a flatheaded screw 43 threadedly mounted in a tapped opening formed in the end face of the projection 42.

The lock may be, and preferably is, of the tumbler type and the barrel 41 thereof is mounted in a sleeve 44 telescopically positioned in a cylindrical bore extending coaxially outwardly from the chamber 36. The wall of the bore 45 and the outer cylindrical surface of the sleeve 44 are each formed with a shallow groove, which grooves, when the sleeve is positioned within the bore in a preselected position, coincide to form a keyway for receiving a key 46 which is force-fitted into the keyway thus formed. The key 46 not only holds the sleeve 44 against rotation but also cooperates with the sleeve 44 to hold the same against longitudinal movement. The inner cylindrical surface of the sleeve 44 is formed with a plurality of longitudinally extending grooves 47 into which the tumblers 48 of the lock project to prevent relative rotation between the barrel 41 and the sleeve 44.

To mount the lock of the present invention to a motorcycle, the body half formed by the elements 24 and 25 carrying the shaft 28 and its associated elements is mounted in position on the one side of the frame member of the cycle after which the body half 22 is slipped over the projecting end of the shaft 28. After the body half 22 has been moved into position, the threaded bolt 27 is passed through the now aligned bores formed in the body half 22 and the element 24 of the body half 23 and the threads thereof engaged in the tapped opening formed in the element 25 of the body half 24. After the bolt 27 has been turned to tightly clamp the two body halves in position, the head of the bolt 27, if desired, may be deformed as by driving a steel ball or the like into the tool engaging socket of the head.

After the two body halves 22 and 23 have been tightly clamped in position on opposite sides of the frame of the motorcycle, the dog 29 is slipped over the projecting end of the shaft 28 and the headless bolt 31 inserted into the opening 32 and threaded into the aligned tapped opening to securely mount the dog to the shaft. The filler plug 33 can then be driven home to close the mouth of the opening 32. This operation completes the installation of the lock to the motorcycle and it will be seen that once the lock is installed, the lock must be destroyed before it can be removed. This is so for the dog 29, in either position thereof, is superimposed over the head of the bolt 27 so that even if the tool engaging head of the latter was not deformed, it would be impossible to gain access to the head. As the bore 32 of the dog is also closed by the plug 33, the dog cannot be removed to gain access to the head of the bolt 27.

In the use of the lock of the present invention, the grooves 47 are so positioned about the inner surface of the sleeve 44 that the tumblers 48 of the lock project into the same when the dog is moved into either the position illustrated in Figure 2 or that of Figure 3 of the drawing. As the dog is held against movement in its normal driving position as shown in Figure 2, there is no danger that the dog would interfere with normal operation of the front fork of the motorcycle. When the motorcycle is to be left unattended, the front fork is moved to position the face 18 of the one flange or arm 16 in engagement with the lug 19 after which the key 49 is inserted into the key receiving opening of the barrel 41 to withdraw the tumblers 48 from the grooves 47 of the sleeve 44. Once the tumblers are withdrawn from the grooves, the key may be used to turn the barrel 41 which, as should now be understood, pivotally moves the bifurcated element 34 arcuately across the chamber 36. This arcuate movement of the bifurcated element 39 rocks the shaft 28 about its longitudinal axis to move the dog 29 from the position shown in Figure 2 to the position of Figure 3.

This is so for the pin 38 is engaged in the slot 37 of the element 34 and will move the latter as the lock barrel 41 is rotated. To strengthen the pin against bending forces, the planar wall of the element 23 is formed with an arcuate slot 51 which receives the free end of the pin 38 and supports the same as the pin is moved with the arm 39. The pin 38 is thus not a cantilever pin and is actually supported at each of its opposite ends so that the pin is subject only to shearing forces in the operation of the lock. As the pin is relatively short and as it may be made of steel highly resistant to shear, there is little danger of the pin failing in use.

In the position of the dog shown in Figure 3, the same engages the outer face of the flange 16 and, after the key has been removed from the barrel 41 and the tumblers thereof are engaged with the sleeve 44, the shaft 28 is locked against rotation and the dog thus prevents return movement of the front fork to dispose the steering wheel in a position aligned with the longitudinal axis of the motorcycle.

The lock of the present invention, although light in weight and relatively small, is extremely rugged and because of the particular construction employed is practically impossible to remove from the motorcycle once it has been installed even by impact blows, such as might be struck by a hammer or like tool. As all means used to mount the lock to the motorcycle are practically inaccessible after the lock has been installed, there is little likelihood that the lock will be removed surreptitiously from the motorcycle. It will thus be seen that the present invention provides a very sturdy lock which, once mounted in position on the motorcycle, cannot be removed without employing metal cutting tools, the use of which would call attention to the fact that someone was attempting to surreptitiously remove the lock from the motorcycle.

Although the now preferred embodiment of the present invention has been shown and described herein, it is to be understood that the invention is not to be limited thereto, for it is susceptible to changes in form and detail within the scope of the appended claims.

I claim:

1. A lock body for motorcycles having an arm rigidly connected to turn with the front fork of the motorcycle into engagement with stop means carried by a frame member of said motorcycle adjacent the steering head column of the same, comprising: a two-part lock body fitting between and clamping against the opposite surfaces of the steering column and said frame member; means for holding the parts of the body together; a shaft rotatably extending through both parts of the lock body; a locking member mounted on one end of said shaft and engageable with said arm when the front wheel is moved into a position at an angle to the longitudinal axis of the vehicle to prevent movement of said wheel out of angular position; and lock mechanism for holding said shaft against rotation to retain said locking member in engaged position with said arm until released by said locking mechanism.

2. A lock body for motorcycles having an arm rigidly connected to turn with the front fork of the motorcycle into engagement with stop means carried by a frame member adjacent the steering head column to limit movement of said fork, comprising: a two-part lock body, the first part fitting between and against one side of the steering head column and of the frame member, and the second part fitting between and against the opposite side of the steering head column and of the frame member; a rotatable shaft mounted in coaxially aligned bores formed in said body parts; a locking member mounted on one end of said shaft and engageable over said arm, after the front fork is moved to position the front wheel at an angle to the longitudinal axis of the vehicle, to prevent movement of said wheel out of angular position; a threaded bore extending through the body part on which the locking member is located and a bore coaxial therewith extending from the inner face of the other part of the lock body part way therethrough; a threaded stud passed through said bore in one body part and engaged in the threaded bore in the other body part and effective to clamp the two body parts together, the locking member in any position thereof preventing access to the head of said stud; and lock mechanism effective to retain said shaft and locking member in engaged position until released by said locking mechanism.

3. A lock for motorcycles having an arm rigidly connected to turn with a steerable wheel of the vehicle into engagement with stop means fixed to stationary frame members of the vehicle, comprising: a lock body rigidly immovably mounted on said frame members; a rotatable shaft mounted in said lock body; a locking member permanently mounted on one end of said shaft and engageable with said arm when the steerable wheel is moved into a position at an angle to the longitudinal axis of the vehicle to prevent movement of said wheel out of angular position; a member mounted on the other end of the shaft and disposed in a recess formed in the part of the lock body on the side opposite the locking member for transmitting rotation to said shaft; and a key operated lock secured in said recess; said lock including a rotatable tumbler barrel mounted in said casing; and a member transmitting rotary movement of said barrel to the member transmitting rotation to said shaft.

4. A lock for motorcycles and the like vehicles having an arm rigidly connected to turn with a steerable wheel of the vehicle into engagement with stop means fixed to a stationary frame member of the vehicle, comprising: a lock body rigidly immovably mounted on said frame member; a rotatable shaft mounted in said lock body; a locking member permanently mounted to one end of said shaft and engageable over said arm when the steerable wheel is moved into a position at an angle to the longitudinal axis of the vehicle to prevent movement of said wheel out of angular position; a bifurcated element rigidly carried by the other end of said shaft and extending at right angles thereto and positioned in a recess in one part of the lock body; lock mechanism mounted in said recess and including a rotatable barrel; an arm fixed to said barrel and rotatable therewith in a plane parallel to the plane of rotation of said bifurcated element; and a pin projecting from said arm and engaged between the bifurcations of said element whereby rotation of the arm by manipulation of the lock mechanism arcuately moves said bifurcated element to rotate said shaft to move the locking member into and out of position to engage the movement limiting arm of said motorcycle.

5. A lock body for motorcycles having an arm rigidly connected to turn with the front fork of the motorcycle into engagement with stop means fixed to the frame member of said motor cycle adjacent the steering head column, comprising: a two-part body member, the first part fitting between and against one side of the steering head column and of the frame member, and the second part fitting between and against the opposite side of the steering head column and of the frame member; a rotatable shaft mounted in coaxial bores in said body parts and having one end thereof projecting beyond the one part; a locking member permanently mounted on said projecting end of said shaft and engageable over said arm, after the fork is moved to dispose the front wheel at an angle to the longitudinal axis of the vehicle to prevent movement of said wheel out of angular position; the body part adjacent the locking member being formed with a bore coaxially aligned with a bore formed in said other body part, at least a part of which latter bore is formed with thread means; a threaded stud passed through said bores and engaged with said threaded means and effective to clamp the two body parts together, the locking member in any position thereof preventing access to the head of said stud; a bifurcated element carried by the other end of said shaft and extending at right angles thereto and arcuately movable in a recess in said body member; lock mechanism mounted in said recess; an arm rotated by the lock mechanism in a plane parallel to the plane of movement of said bifurcated element; and a pin projecting from said arm and engaged between the bifurcations of said element whereby rotation of the arm by manipulation of the lock mechanism is effective to arcuately move said element to rotate said shaft to move the locking member into and out of position to engage the arm arranged to turn with the steerable wheel of the vehicle.

LLOYD E. HINDS.

REFERENCES CITED

The following references are of record in the file of this patent:

UNITED STATES PATENTS

| Number | Name | Date |
|---|---|---|
| 451,035 | Fortier | Apr. 28, 1891 |
| 1,272,815 | Kurtz | July 16, 1918 |

FOREIGN PATENTS

| Number | Country | Date |
|---|---|---|
| 26,146 | Denmark | June 21, 1920 |
| 331,666 | Germany | Jan. 21, 1921 |